United States Patent
Masunaga et al.

(10) Patent No.: US 12,435,217 B2
(45) Date of Patent: Oct. 7, 2025

(54) POLYARYLETHERKETONE RESIN COMPOSITION, FIBER-REINFORCED RESIN BASE MATERIAL, AND MOLDED ARTICLE

(71) Applicant: TORAY INDUSTRIES, INC., Tokyo (JP)

(72) Inventors: Atsushi Masunaga, Nagoya (JP); Hidenobu Takao, Nagoya (JP); Kenji Ishitake, Nagoya (JP); Nobuyuki Tomioka, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 667 days.

(21) Appl. No.: 17/788,502

(22) PCT Filed: Feb. 5, 2021

(86) PCT No.: PCT/JP2021/004296
§ 371 (c)(1),
(2) Date: Jun. 23, 2022

(87) PCT Pub. No.: WO2021/161912
PCT Pub. Date: Aug. 19, 2021

(65) Prior Publication Data
US 2023/0024800 A1    Jan. 26, 2023

(30) Foreign Application Priority Data

Feb. 13, 2020 (JP) ................................ 2020-022088
Jul. 29, 2020 (JP) ................................ 2020-127902

(51) Int. Cl.
*C08L 61/16* (2006.01)
*C08L 71/10* (2006.01)
*C08L 79/08* (2006.01)

(52) U.S. Cl.
CPC .............. *C08L 61/16* (2013.01); *C08L 71/10* (2013.01); *C08L 79/08* (2013.01); *C08G 2650/40* (2013.01)

(58) Field of Classification Search
CPC .......... C08L 61/16; C08L 71/10; C08L 79/08; C08L 67/00; C08L 67/03; C08L 69/00; C08G 2650/40; C08K 5/17; C08K 7/02
See application file for complete search history.

(56) References Cited

U.S. PATENT DOCUMENTS

| | | | |
|---|---|---|---|
| 5,681,888 | A | 10/1997 | Nomura et al. |
| 2002/0193533 | A1 | 12/2002 | Kamo et al. |
| 2017/0145208 | A1 | 5/2017 | Lu et al. |
| 2021/0230370 | A1 | 7/2021 | Sakai et al. |

FOREIGN PATENT DOCUMENTS

| | | |
|---|---|---|
| CA | 2023514 A1 | 2/1991 |
| JP | 3-106964 A | 5/1991 |
| JP | 8-253671 A | 10/1996 |
| JP | 9-20883 A | 1/1997 |
| JP | 2003-73560 A | 3/2003 |
| JP | 2007-146123 A | 6/2007 |
| WO | WO 2019/220969 A1 | 11/2019 |

OTHER PUBLICATIONS

Machine English translation of JP 2007-146123, Tachikawa et al., Jun. 14, 2007.*
International Search Report, issued in PCT/JP2021/004296, PCT/ISA/210, dated Apr. 13, 2021.
Written Opinion of the International Searching Authority, issued in PCT/JP2021/004296, PCT/ISA/237, dated Apr. 13, 2021.

* cited by examiner

*Primary Examiner* — Patrick D Niland
(74) *Attorney, Agent, or Firm* — Birch, Stewart, Kolasch & Birch, LLP

(57) ABSTRACT

The present invention addresses the problem of providing a polyaryletherketone resin composition having excellent toughness and fluidity, a fiber-reinforced resin base material having excellent impregnating ability and toughness, and a molded article thereof. In order to solve said problem, the present invention has the following compositional make-up. A polyaryletherketone resin composition containing, with respect to (A) 100 parts by mass of a polyaryletherketone, (B) 1-100 parts by mass of a liquid crystalline polyester, wherein the polyaryletherketone resin composition forms a sea-island structure, and the average diameter of the island phases is 10-1000 nm.

17 Claims, No Drawings

POLYARYLETHERKETONE RESIN COMPOSITION, FIBER-REINFORCED RESIN BASE MATERIAL, AND MOLDED ARTICLE

TECHNICAL FIELD

The present invention relates to a polyaryletherketone resin composition, a fiber reinforced plastic base, and a molded article. More specifically, the present invention relates to a polyaryletherketone resin composition containing a polyaryletherketone and a liquid crystalline polyester or a thermoplastic resin having a carbonyl group and/or an ester bond, a fiber reinforced plastic base, and molded articles thereof.

BACKGROUND ART

The polyaryletherketone is a representative super engineering plastic having excellent properties such as heat resistance, chemical resistance, flame retardance, sliding property, and friction wear characteristics. The polyaryletherketone is widely applied to mechanical parts, automobile parts, aviation parts, electrical and electronic parts, and the like because of its excellent physical properties, and there is an increasing demand for applications in fields where use conditions are extremely severe and as a substitute material for metal. In recent years, demands for thin wall moldings and molded articles having complicated shapes have increased because of an increase in requirement for miniaturization and weight reduction of materials, and improvement in fluidity has been required. Further, the polyaryletherketone is often used as a fiber reinforced plastic base having advanced mechanical properties, and fiber reinforced plastic bases highly filled with reinforcing fibers are required.

As a means for improving the fluidity of a polyaryletherketone, Patent Document 1 discloses a polyaryletherketone having a specified melt viscosity. Patent Document 2 discloses a method of blending a liquid crystalline polymer into a polyaryletherketone. Patent Document 3 discloses a method of blending a polyarylenesulfide with polyarylketone.

As a fiber reinforced plastic base containing a polyaryletherketone, Patent Document 4 discloses a method of blending a plasticizer in a polyaryletherketone and reinforcing the base with continuous fibers. Patent Document 5 discloses a fiber reinforced prepreg containing a polyaryletherketone having a specified intrinsic viscosity and reinforcing fibers.

PRIOR ART DOCUMENTS

Patent Documents

Patent Document 1: Japanese Patent Laid-open Publication No. 2007-506833
Patent Document 2: Japanese Patent No. 5528697
Patent Document 3: Japanese Patent Laid-open Publication No. 57-172954
Patent Document 4: Japanese Patent Laid-open Publication No. 59-47234
Patent Document 5: Japanese Patent Laid-open Publication No. 2019-147876

SUMMARY OF THE INVENTION

Problems to be Solved by the Invention

In the method proposed in Patent Document 1, a sufficient flowability improving effect cannot obtained and there is a problem in toughness. In the methods proposed in Patent Documents 2 and 3, a flowability improving effect can be obtained, but the compatibility with the liquid crystalline polymer and the polyarylenesulfide is poor, and there is a problem in toughness.

In the method proposed in Patent Document 4, a large amount of plasticizer is used, which causes not only a problem in terms of the environment and cost but also a problem of lowering toughness. In the method proposed in Patent Document 5 a fiber reinforced prepreg having excellent toughness can be obtained, but the impregnation property is poor because of its high resin viscosity, and there is a problem that voids are included when the production speed is increased.

An object of the present invention is to solve the problems of the conventional technologies and to provide a polyaryletherketone resin composition having excellent fluidity and toughness, a fiber reinforced plastic base having excellent impregnation property and toughness, and a molded article thereof.

Solutions to the Problems

The present invention has been achieved as a result of studying the solution of the problems in the conventional technology described above as an object. The present invention has the following configurations.

[1] A polyaryletherketone resin composition including, with respect to 100 parts by mass of (A) a polyaryletherketone, 1 part by mass or more and 100 parts by mass or less of (B) a liquid crystalline polyester, wherein the polyaryletherketone resin composition forms a sea island structure, and an island phase has an average diameter of 10 nm or more and 1000 nm or less.

[2] The polyaryletherketone resin composition according to [1], further including, with respect to 100 parts by mass of the polyaryletherketone (A), 0.1 parts by mass or more and 10 parts by mass or less of (C) an amine compound having two or more amino groups.

[3] The polyaryletherketone resin composition according to [1], further including, per 100 parts by mass of the polyaryletherketone (A) 0.1 parts by mass or more and 15 parts by mass or less of (D) a polyarylate, and 0.4 parts by mass or more and 60 parts by mass or less of (E) a polyimide.

[4] A polyaryletherketone resin composition including, with respect to 100 parts by mass of (A) a polyaryletherketone, 0.1 parts by mass or more and less than 10 parts by mass of (C) an amine compound having two or more amino groups, and 1 part by mass or more and less than 100 parts by mass of (F) a thermoplastic resin having a carbonyl group and/or an ester bond, wherein in the polyaryletherketone resin composition, the polyaryletherketone (A) forms a sea phase, the thermoplastic resin (F) having a carbonyl group and/or an ester bond forms an island phase, and the island phase has a particle diameter of 10 nm or more and 1000 nm or less.

[5] The polyaryletherketone resin composition according to [4], wherein the thermoplastic resin (F) having a carbonyl group and/or an ester bond is at least one thermoplastic resin selected from the group consisting of a polyimide resin, a polyester resin, a polyarylate resin, and a polycarbonate resin.

[6] The polyaryletherketone resin composition according to any one of [2], [4], and [5], wherein the amine compound (C) having two or more amino groups has a vapor pressure of less than 1 atm at 300° C.

[7] The polyaryletherketone resin composition according to any one of [2], [4], [5], and [6], wherein the amine compound (C) having two or more amino groups is an amine compound represented by a general formula (I) shown below:

[Chemical Formula 1]

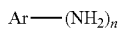  (I)

wherein Ar represents an aryl group, and n is an integer of 2 to 6.

[8] A polyaryletherketone resin composition including, per 100 parts by mass of (A) a polyaryletherketone, 1 part by mass or more and 30 parts by mass or less of (B) a liquid crystalline polyester, 0.1 parts by mass or more and 15 parts by mass or less of (D) a polyarylate, and 0.4 parts by mass or more and 60 parts by mass or less of (E) a polyimide.

[9] The polyaryletherketone resin composition according to [8], wherein the polyaryletherketone resin composition forms a sea island structure, and an island phase has an average diameter of 10 nm or more and 1000 nm or less.

[10] The polyaryletherketone resin composition according to [8] or [9], the polyaryletherketone resin composition satisfying all of mass ratios represented by formulas (1) to (3) shown below:

[the polyarylate (D) (parts by mass)]/[the liquid crystalline polyester (B) (parts by mass)]≥0.10  (1)

[the polyarylate (D) (parts by mass)]/[the liquid crystalline polyester (B) (parts by mass)]≤1.25  (2)

[the polyarylate(D) (parts by mass)]/[the polyimide (E) (parts by mass)]≤0.25  (3).

[11] A fiber reinforced polyaryletherketone resin composition obtained by kneading 10 parts by mass or more and 400 parts by mass or less of (G) a fibrous filler with respect to 100 parts by mass of the polyaryletherketone (A) with the polyaryletherketone resin composition according to any one of [1] to [10].

[12] A fiber reinforced plastic base obtained by impregnating the fibrous filler (G) in a continuous form or a reinforcing fiber base in which the fibrous filler (G) in a discontinuous form is dispersed with the polyaryletherketone resin composition according to any one of [1] to [10].

[13] A molded article obtained by molding the polyaryletherketone resin composition according to any one of [1] to [10], the fiber reinforced polyaryletherketone resin composition according to [11], or the fiber reinforced plastic base according to [12].

Effects of the Invention

The present invention can achieve a polyaryletherketone resin composition having excellent fluidity and toughness. Molded articles obtained by molding the polyaryletherketone resin composition of the present invention can be used as, for example, resin molded articles such as electrical and electronic device parts, automobile parts, aircraft parts, and machine parts, fibers for clothing and industrial materials, and films for packaging and magnetic recording.

EMBODIMENTS OF THE INVENTION

A polyaryletherketone resin composition according to a first embodiment of the present invention includes (A) a polyaryletherketone and (B) a liquid crystalline polyester, wherein the polyaryletherketone resin composition forms a sea island structure, and an island phase has an average diameter of 10 nm or more and 1000 nm or less. A polyaryletherketone resin composition according to a second embodiment of the present invention includes (A) a polyaryletherketone, (F) a thermoplastic resin having a carbonyl group and/or an ester bond, and (C) an amine compound having two or more amino groups, wherein the polyaryletherketone resin composition forms a sea island structure, and an island phase has an average diameter of 10 nm or more and 1000 nm or less. A polyaryletherketone resin composition according to a third embodiment of the present invention includes (A) a polyaryletherketone, (B) a liquid crystalline polyester, (D) a polyarylate, and (E) a polyimide.

First Embodiment

<(A) Polyaryletherketone>

The polyaryletherketone (A) used in the first embodiment of the present invention is not particularly limited as long as it is a thermoplastic resin having a repeat unit in which an aryl group is bonded by an ether group and a ketone group, and is preferably a polymer having the two types of units of the following general formula (II).

[Chemical Formula 2]

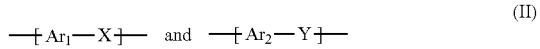  (II)

wherein $Ar_1$ and $Ar_2$ each represent an aryl group, $Ar_1$ and $Ar_2$ may be the same or different, and $Ar_1$ and $Ar_2$ can be preferably selected from 1,3-phenylene, 1,4-phenylene, 4,4'-biphenylene, 1,4-bis(4-phenoxybenzoyl)phenylene, 1,4-naphthylene, 1,5-naphthylene, and 2,6-naphthylene or anthracenylene units, X represents an electron-withdrawing group, and can be preferably selected from a carbonyl group or a sulfonyl group, and Y is preferably selected from the group consisting of an oxygen atom, a sulfur atom, an alkylene group (for example, —$CH_2$—), an isopropylidene group, and a hexafluoroisopropylidene group.

In the general formula (II), preferably at least 50% and more preferably at least 70% of X groups are carbonyl groups, and preferably at least 50% and more preferably at least 70% of Y groups are oxygen atoms.

Examples of the polyaryletherketone (A) include polyetheretherketone having a unit of the following formula (III) and/or the following formula (IV), polyetherketone having a unit of the following formula (V), polyetherketoneketone having a unit of the following formula (VI) and/or a unit of the following formula (VII), and polyetheretherketoneketone formed of a unit of the following formula (VIII). They can be used singly or in combination of two or more kinds thereof.

[Chemical Formula 3]

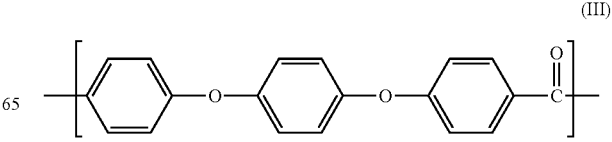  (III)

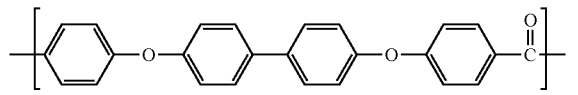

(IV)

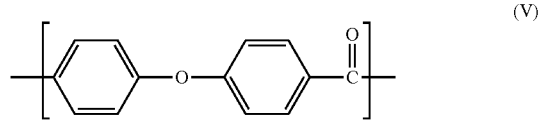

(V)

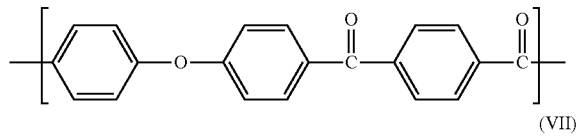

(VI)

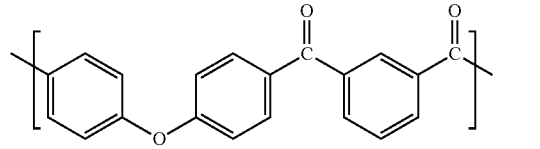

(VII)

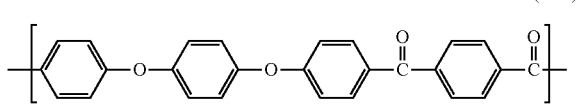

(VIII)

The polyaryletherketone (A) is not particularly limited, and for example, polyaryletherketones put on the market as "VESTAKEEP (registered trademark)" manufactured by Daicel-Evonik Ltd., "VICTREX (registered trademark)" manufactured by Victrex Japan Inc., "KEPSTAN (registered trademark)" manufactured by Arkema S.A., "AvaSpire (registered trademark)", "KetaSpire (registered trademark)" and "NovaSpire (registered trademark)" manufactured by Solvay Specialty Polymers Japan K.K., can also be obtained and used.

As a method for measuring the content of the polyaryletherketone (A), the polyaryletherketone resin composition is dissolved in a solvent in which the polyaryletherketone (A) dissolves, for example, sulfuric acid or the like, the insoluble matter is filtered, and the dissolved matter is precipitated and recovered with a poor solvent. A measurement is performed by qualitative quantitative analysis such as high performance liquid chromatography using for example a mixed solvent of chloroform and dichloroacetic acid, a mixed solvent of chlorophenol and a halogenated benzene, or the like as a solvent in which the polyaryletherketone (A), which is the recovered product, dissolves.

<Liquid Crystalline Polyester (B)>

The liquid crystalline polyester (B) used in the first embodiment of the present invention is a crystalline polyester formed of an oxycarbonyl unit, a dioxy unit, and a dicarbonyl unit and exhibiting thermotropic liquid crystal.

Representative examples of the oxycarbonyl unit include a structural unit derived from an aromatic hydroxycarboxylic acid such as p-hydroxybenzoic acid, m-hydroxybenzoic acid, or 6-hydroxy-2-naphthoic acid, representative examples of the dioxy unit include a structural unit derived from 4,4'-dihydroxybiphenyl, 3,4'-dihydroxybiphenyl, hydroquinone, resorcinol, 2,6-dihydroxynaphthalene, 2,7-dihydroxynaphthalene, bisphenol A, 4,4'-dihydroxydiphenyl ether, ethylene glycol, propylene glycol, 1,4-butanediol, neopentyl glycol, 1,4-cyclohexanediol, or 1,4-cyclohexanedimethanol, and representative examples of the dicarbonyl unit include a structural unit derived from terephthalic acid, isophthalic acid, 2,6-naphthalenedicarboxylic acid, 4,4'-diphenyldicarboxylic acid, 3,3'-diphenyldicarboxylic acid, 2,2'-diphenyldicarboxylic acid, 1,2-bis(phenoxy)ethane-4,4'-dicarboxylic acid, 4,4'-diphenyletherdicarboxylic acid, adipic acid, 1,4-cyclohexanedicarboxylic acid, or 1,3-cyclohexanedicarboxylic acid.

As the liquid crystalline polyester (B), for example, commercially available products such as "Siveras (registered trademark)" manufactured by Toray Industries, Inc., "LAPEROS (registered trademark)" manufactured by Polyplastics Co., Ltd., and "SUMIKASUPER LCP (registered trademark)" manufactured by Sumitomo Chemical Co., Ltd. can also be obtained and used.

The content of the liquid crystalline polyester (B) is 1 part by mass or more and 100 parts by mass or less, preferably in a range of 3 parts by mass or more and 70 parts by mass or less, and more preferably in a range of 5 parts by mass or more and 30 parts by mass or less with respect to 100 parts by mass of the polyaryletherketone (A). When the content of the liquid crystalline polyester (B) is less than 1 part by mass, the effect of improving fluidity and impregnation property cannot be obtained, and when the content is more than 100 parts by mass, the liquid crystalline polyester (B) coarsely disperses, and the toughness decreases.

As a method for measuring the content of the liquid crystalline polyester (B), the polyaryletherketone resin composition is dissolved using a solvent in which only the liquid crystalline polyester (B) dissolves, the insoluble matter is filtered, and the dissolved matter is precipitated and recovered with a poor solvent. A measurement is performed by qualitative quantitative analysis such as high performance liquid chromatography using a solvent in which the liquid crystalline polyester (B), which is the recovered product, dissolves.

The polyaryletherketone resin composition of the first embodiment of the present invention has a structure in which the polyaryletherketone (A) forms a sea phase, the liquid crystalline polyester (B) forms an island phase, and the island phase has an average diameter of 10 nm or more and 1000 nm or less. The average diameter is preferably 10 nm or more and 500 nm or less, and more preferably 10 nm or more and 300 nm or less. The average diameter referred to herein is measured by cutting the vicinity of the central portion of an injection molded article of the standard of ISO527-2-5A in a resin flow direction to obtain a thin section having a thickness of 80 nm, measuring the maximum diameter and the minimum diameter of each of 100 freely-selected particles to obtain an average value when the section is observed with a transmission electron microscope, and then obtaining a number average value which is an average value with respect to the average value of the 100 particles. When the average diameter of the island phase is more than 1000 nm, the toughness decreases. The average diameter of the island phase is usually 10 nm or more.

Means for obtaining the polyaryletherketone resin composition of the first embodiment in which the average diameter of the island phase is 10 nm or more and 1000 nm or less is not particularly limited, and for example, (C) an amine compound having two or more amino groups described later can be preferably used.

<(C) Amine Compound Having Two or More Amino Groups>

The amine compound (C) having two or more amino groups used in the first embodiment of the present invention (hereinafter, it may be simply described as "amine compound (C)") is not particularly limited as long as it has two or more amino groups, but the number of amino groups is 2 or more and 10 or less, and more preferably 2 or more and 6 or less from the viewpoint of maintaining the fluidity and toughness. An amine compound having only one amino group cannot improve the toughness. An amine compound having 11 or more amino groups may lower the effect of improving the fluidity and toughness. In addition, since an amine compound that does not volatilize when the polyaryletherketone resin composition is heated at a temperature equal to or higher than the melting point of the polyaryletherketone (A) is preferable, an amine compound having a vapor pressure of less than 1 atm at 300° C. is preferable. An amine compound having a vapor pressure of less than 1 atm at more preferably 325° C. and still more preferably 350° C. is used. When the polyaryletherketone resin composition of the present invention is melt-mixed and molded, how much the amine compound is retained in the polyaryletherketone resin composition depends on its volatility, and an amine compound having a vapor pressure of 1 atm or more at 300° C., which has high volatility, is not sufficiently retained in the resin composition in some cases. Some kinds of amine compound sublimate and do not show a true boiling point, therefore the limit of volatility is expressed as the limit of vapor pressure rather than the limit of boiling point. For compounds that show a boiling point, the limit of volatility can be expressed as a boiling point higher than 300° C. at 1 atm.

Examples of preferable amine compound (C) include aliphatic amines such as 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, and 1,18-diaminooctadecane, and aromatic amine compounds such as 2,2'-biphenyldiamine, 4,4'-biphenyldiamine, 4,4'-diaminodiphenyl ether, 3,3'-diaminodiphenyl sulfone, 4,4'-diaminodiphenyl sulfone, 1,4-bis(4-aminophenoxy)benzene, 1,3-bis(3-aminophenoxy)benzene, 2,2-bis[4-(4-aminophenoxy)phenyl]hexafluoropropane, 9,9-bis(4-aminophenyl)fluorene, 2,2-bis[4-(4-aminophenoxy)phenyl]propane, 4,4'-diaminobenzophenone, 3,3'-diaminobenzophenone, meta-tolidine, ortho-tolidine, and 3,3'-diaminobenzidine.

Of these, as the amine compound (C), an amine compound represented by the following general formula (I) is particularly preferable from the viewpoint that it is easily retained in the polyaryletherketone resin composition, and examples thereof include aromatic amine compounds such as 2,2'-biphenyldiamine, 4,4'-biphenyldiamine, 4,4'-diaminodiphenyl ether, 3,3'-diaminodiphenyl sulfone, 4,4'-diaminodiphenyl sulfone, 1,4-bis(4-aminophenoxy)benzene, 1,3-bis(3-aminophenoxy)benzene, 2,2-bis[4-(4-aminophenoxy)phenyl]hexafluoropropane, 9,9-bis(4-aminophenyl)fluorene, 2,2-bis[4-(4-aminophenoxy)phenyl]propane, 4,4'-diaminobenzophenone, 3,3'-diaminobenzophenone, meta-tolidine, ortho-tolidine and 3,3'-diaminobenzidine.

[Chemical Formula 4]

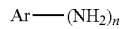

(I)

wherein Ar represents an aryl group, and can be preferably selected from a phenyl group, a tolyl group, a xylyl group, a naphthyl group, a biphenyl group, a diphenyl ether group, a diphenyl ketone group, a diphenyl sulfone group, and the like, and n represents the number of amino groups and is an integer of 2 to 6.

Containing the amine compound (C) in the polyaryletherketone resin composition of the present invention causes the amino group of the amine compound (C) to bond to the polyaryletherketone (A) by a nucleophilic addition reaction to a ketone group and to bond to the liquid crystalline polyester (B) by a nucleophilic addition reaction to a carbonyl group and/or a nucleophilic acyl substitution to an ester bond, and therefore the polyaryletherketone (A) and the liquid crystalline polyester (B) are bonded via the amine compound (C). This causes the compatibility between the polyaryletherketone (A) and the liquid crystalline polyester (B) to improve and causes the liquid crystalline polyester (B) to finely disperse as an island phase of nanometer orders, and therefore it is possible to obtain a polyaryletherketone resin composition having excellent toughness.

Further, the nucleophilic addition reaction of the amino group of the amine compound (C) with the ketone group of the polyaryletherketone (A) causes the polyaryletherketone (A) to form a crosslinked structure via the amine compound (C), and therefore it is possible to obtain a polyaryletherketone resin composition having more excellent toughness.

The content of the amine compound (C) in the polyaryletherketone resin composition is preferably 0.1 parts by mass or more and 10 parts by mass or less, more preferably 0.1 parts by mass or more and 5 parts by mass or less, still more preferably 0.2 parts by mass or more and 1 part by mass or less with respect to 100 parts by mass of the polyaryletherketone (A). When the content of the amine compound (C) is less than 0.1 parts by mass, it may be difficult to obtain high toughness, and when the content is more than 10 parts by mass, the polyaryletherketone (A) is excessively crosslinked, and therefore the fluidity may lower, or the liquid crystalline polyester (B) may coarsely disperse to lower the toughness.

As a method for measuring the content of the amine compound (C), the polyaryletherketone resin composition is finely pulverized, the pulverized particles are immersed in a solvent in which only the amine compound (C) dissolves, for example, acetone, the amine compound (C) is extracted, and the content can be measured by qualitative quantitative analysis such as high performance liquid chromatography.

As another means for obtaining the polyaryletherketone resin composition of the first embodiment in which the average diameter of the island phase is 10 nm or more and 1000 nm or less, (D) a polyarylate and (E) a polyimide described later can also be preferably used.

<(D) Polyarylate>

The polyarylate (D) used in the present invention is an amorphous wholly aromatic polyester. Representative examples thereof include a polymer composed of an aromatic dioxy unit derived from bisphenol A and an aromatic dicarbonyl unit derived from terephthalic acid.

As the polyarylate (D), for example, commercially available products such as "U-100 (registered trademark)", "D powder (registered trademark)", and "L powder (registered trademark)" manufactured by Unitika Ltd. can be obtained and used.

The lower limit of the content of the polyarylate (D) is preferably 0.1 parts by mass or more, more preferably 1 part by mass or more, still more preferably 2 parts by mass or more per 100 parts by mass of the polyaryletherketone (A). When the content is less than 0.1 parts by mass, the phase separation structure may become coarse, and the toughness may decrease. The upper limit of the content of the polyarylate (D) is preferably 15 parts by mass or less, more preferably 12.5 parts by mass or less, still more preferably 10 parts by mass or less per 100 parts by mass of the polyaryletherketone (A). When the content is more than 15 parts by mass, the phase separation structure may become coarse, and the toughness may be decrease.

<(E) Polyimide>

The polyimide (E) used in the present invention is a polymer having an imide bond in a repeat unit, and in the present invention, in addition to the imide bond, polyetherimide having an ether bond and polyamideimide having an amide bond are also classified as a polyimide.

As the polyimide (E), for example, commercially available products such as "Ultem (registered trademark)" and "Extem (registered trademark)" manufactured by SABIC Innovative Plastics, "Aurum (registered trademark)" manufactured by Mitsui Chemicals, Inc., and "Torlon (registered trademark)" manufactured by Solvay Specialty Polymers Japan K.K. can be obtained and used.

The lower limit of the content of the polyimide (E) is preferably 0.4 parts by mass or more, more preferably 10 parts by mass or more, still more preferably 20 parts by mass or more per 100 parts by mass of the polyaryletherketone (A). When the content is less than 0.4 parts by mass, the phase separation structure may become coarse, and the toughness may decrease. The upper limit of the content of the polyimide (E) is preferably 60 parts by mass or less, more preferably 50 parts by mass or less, still more preferably 40 parts by mass or less per 100 parts by mass of the polyaryletherketone (A). When the content is more than 60 parts by mass, the effect of improving the fluidity and impregnation property are not obtained in some cases.

In the present invention, the polyimide (E) and the polyarylate (D) exhibit high compatibility with the polyaryletherketone (A), and the polyarylate (D) undergoes transesterification reaction with the liquid crystalline polyester (B), which can improve the compatibility/dispersibility of the liquid crystalline polyester (B) with the polyaryletherketone (A) and achieve both the fluidity and toughness.

A method for measuring the content of each resin component in the polyaryletherketone resin composition containing the polyaryletherketone (A), the liquid crystalline polyester (B), the polyarylate (D), and the polyimide (E) is shown. First, the resin composition is extracted using a halogenated alkane such as chloroform or dichloromethane, the extracted matter is precipitated and recovered with a poor solvent, and the polyarylate (D), which is the recovered product, is qualitatively and quantitatively determined by NMR analysis, high performance liquid chromatography analysis, or the like. Next, the obtained insoluble matter is extracted using an organic amide such as N-methyl-2-pyrrolidone or N,N-dimethylformamide, the extracted matter is precipitated and recovered with a poor solvent, and the polyimide (E), which is the recovered product, is qualitatively and quantitatively determined by NMR analysis, high performance liquid chromatography analysis, or the like. Next, the obtained insoluble matter is extracted using concentrated sulfuric acid, the extracted matter is precipitated and recovered with a poor solvent, and the polyaryletherketone (A), which is the recovered product, is qualitatively and quantitatively determined by NMR analysis, high performance liquid chromatography analysis, or the like. Next, the obtained insoluble matter is extracted using a pentafluorophenol/halogenated carbon mixed solvent such as pentafluorophenol/chloroform or pentafluorophenol/dichlorobenzene, the extracted matter is precipitated and recovered with a poor solvent, and the liquid crystalline polyester (B), which is the recovered product, is qualitatively and quantitatively determined by NMR analysis, high performance liquid chromatography analysis, or the like.

When another component such as a resin or a low molecular weight organic compound other than those described above is detected from the result of NMR analysis, high performance liquid chromatography analysis, or the like of each recovered product, the other component can be qualitatively and quantitatively determined by further fractionating and analyzing each recovered product with a solvent.

Second Embodiment

The polyaryletherketone resin composition according to the second embodiment of the present invention contains (A) a polyaryletherketone, (F) a thermoplastic resin having a carbonyl group and/or an ester bond, and (C) an amine compound having two or more amino groups.

The polyaryletherketone (A) and the amine compound (C) having two or more amino groups used in the second embodiment of the present invention are the same as those used in the first embodiment.

The content of the amine compound (C) in the polyaryletherketone resin composition is preferably 0.1 parts by mass or more and less than 10 parts by mass, more preferably 0.1 parts by mass or more and less than 5 parts by mass, still more preferably 0.2 parts by mass or more and less than 1 part by mass with respect to 100 parts by mass of the polyaryletherketone (A). When the content of the amine compound (C) is less than 0.1 parts by mass, it may be difficult to obtain high toughness, and when the content of the amine compound (C) is 10 parts by mass or more, the polyaryletherketone (A) is excessively crosslinked, which may cause the fluidity to decrease, or the thermoplastic resin (F) is coarsely dispersed, which may cause the toughness to decrease.

The contents of the polyaryletherketone (A) and the amine compound (C) having two or more amino groups can be measured by the same method as in the first embodiment.

<(F) Thermoplastic Resin Having Carbonyl Group and/or Ester Bond>

The thermoplastic resin (F) having a carbonyl group and/or an ester bond (hereinafter, it may be simply referred to as "thermoplastic resin (F)") is a thermoplastic resin having a carbonyl group and/or an ester bond in a main chain skeleton. (F) Thermoplastic resin is not particularly limited as long as it is a thermoplastic resin having a carbonyl group and/or an ester bond and is a thermoplastic resin other than the polyaryletherketone (A), and for example, it is at least one thermoplastic resin selected from the group consisting of a polyimide resin, a polyester resin, a polyarylate resin, and a polycarbonate resin, and may be used singly or in combination of two or more kinds thereof.

The polyimide resin is a polymer having an imide bond in a repeat unit. In the present invention, in addition to an imide bond in a repeating unit, a polyetherimide resin having an ether bond or a polyamideimide resin having an amide bond is also classified as a polyimide resin. The polyimide resin is not particularly limited, and for example, those put on the market as "Ultem (registered trademark)" and "Extem (registered trademark)" manufactured by SABIC Innovative Plastics, "Aurum (registered trademark)" manufactured by Mitsui Chemicals, Inc., and "Torlon (registered trademark)" manufactured by Solvay Specialty Polymers Japan K.K. can also be obtained and used.

Examples of the polyester resin include polyesters obtained from a polycondensate of a dicarboxylic acid and a glycol, a ring-opening polymer of a cyclic lactone, a polycondensate of a hydroxycarboxylic acid, and a polycondensate of a dibasic acid and a glycol, and specific examples thereof include, a semi-aromatic polyester resin such as a polyethylene terephthalate resin, a polypropylene terephthalate resin, a polybutylene terephthalate resin, a polyethylene naphthalate resin, a polybutylene naphthalate resin, a polycyclohexanedimethylene terephthalate resin, and polyethylene-1,2-bis(phenoxy)ethane-4,4'-dicarboxylate, a semi-aromatic polyester resin having a melting point such as polyethylene-1,2-bis(phenoxy)ethane-4,4'-dicarboxylate/isophthalate copolymer, a polybutylene terephthalate/decane dicarboxylate copolymer, and a polycyclohexanedimethylene terephthalate/isophthalate copolymer, and a crystalline polyester resin composed of a mixture thereof as long as it has a melting point. In addition, a crystalline polyester resin having thermotropic liquid crystal composed of a structural unit selected from an aromatic oxycarbonyl unit, an aromatic dioxy unit, an aromatic dicarbonyl unit, an aromatic aminooxy unit, an ethylene oxide unit, and the like can also be used. A liquid crystalline polyester is particularly preferable from the viewpoint that the fluidity and impregnation property can be improved without impairing the heat resistance of the polyaryletherketone resin composition.

The polyarylate resin is an amorphous wholly aromatic polyester, and a typical example thereof is an amorphous high Tg polymer obtained from an aromatic dihydroxy compound such as bisphenol A or a derivative thereof and an aromatic dicarboxylic acid such as terephthalic acid or a derivative thereof. For example, commercially available products such as "U-100 (registered trademark)", "D powder (registered trademark)", and "L powder (registered trademark)" manufactured by Unitika Ltd. can be obtained and used.

The polycarbonate resin is a resin having a carbonate bond, and is a polymer or copolymer obtained by reacting an aromatic hydroxy compound or an aromatic hydroxy compound and a small amount of a polyhydroxy compound with a carbonate precursor. Examples of the aromatic hydroxy compound include 2,2-bis(4-hydroxyphenyl)propane (commonly called as bisphenol A), 2,2-bis(4-hydroxyphenyl) methane, 1,1-bis(4-hydroxyphenyl)ethane, and 1,1-bis(4-hydroxyphenyl)cyclohexane, and these compounds may be used singly or in combination of two or more kinds thereof. As the carbonate precursor, a carbonyl halide, a carbonate ester, a haloformate, or the like is used, and specific examples thereof include phosgene and diphenyl carbonate.

The content of the thermoplastic resin (F) is 1 part by mass or more and less than 100 parts by mass, preferably in a range of from 3 parts by mass or more to less than 70 parts by mass, and more preferably in a range of from 5 parts by mass or more and less than 30 parts by mass with respect to 100 parts by mass of the polyaryletherketone (A). When the content of the thermoplastic resin (F) is less than 1 part by mass, the effect of improving fluidity and impregnation property cannot be obtained, and when the content is 100 parts by mass or more, the thermoplastic resin (F) is coarsely dispersed, and the toughness decreases.

As a method for measuring the content of the thermoplastic resin (F), the polyaryletherketone resin composition is dissolved using a solvent in which only the thermoplastic resin (F) dissolves, the insoluble matter is filtered, and the dissolved matter is precipitated and recovered with a poor solvent. The content can be measured by qualitative quantitative analysis such as high performance liquid chromatography using a solvent in which the thermoplastic resin (F), which is the recovered product, dissolves.

The polyaryletherketone resin composition according to the second embodiment of the present invention has a structure in which the polyaryletherketone (A) forms a sea phase, the thermoplastic resin (F) forms an island phase, and the island phase has an average diameter of 10 nm or more and 1000 nm or less. The average diameter is preferably 10 nm or more and 500 nm or less, and more preferably 10 nm or more and 300 nm or less. The average diameter referred to herein is measured by the same method as the method used in the first embodiment. When the average diameter of the island phase is more than 1000 nm, the toughness decreases. The average diameter of the island phase is usually 10 nm or more.

Third Embodiment

The polyaryletherketone resin composition according to the third embodiment of the present invention contains (A) a polyaryletherketone, (B) a liquid crystalline polyester, (D) a polyarylate, and (E) a polyimide.

Here, the polyaryletherketone (A), the liquid crystalline polyester (B), the polyarylate (D), and the polyimide (E) refer to the same ones as those used in the first embodiment.

The lower limit of the content of the liquid crystalline polyester (B) is 1 part by mass or more, preferably 5 parts by mass or more, and more preferably 10 parts by mass or more per 100 parts by mass of the polyaryletherketone (A). When the content is less than 1 part by mass, the effect of improving fluidity and impregnation property cannot be obtained. The upper limit of the content of the liquid crystalline polyester (B) is 30 parts by mass or less, preferably 25 parts by mass or less, and more preferably 20 parts by mass or less per 100 parts by mass of the polyaryletherketone (A). When the content is more than 30 parts by mass, the phase separation structure may become coarse, and the toughness may decrease.

The contents of the polyarylate (D) and the polyimide (E) are the same as those in the first embodiment.

<Mass Ratio Between (B) Liquid Crystalline Polyester and (D) Polyarylate>

When the mass ratio between the liquid crystalline polyester (B) and the polyarylate (D) in the polyaryletherketone resin composition satisfies the following formula (1), the phase separation structure of the polyaryletherketone resin composition is refined to improve toughness, which is particularly preferable.

$$[(D) \text{ polyarylate (parts by mass)}]/[(B) \text{ liquid crystalline polyester (parts by mass)}] \geq 0.10 \quad (1).$$

When the mass ratio between the liquid crystalline polyester (B) and the polyarylate (D) satisfies the following formula (2), the fluidity and impregnation property of the polyaryletherketone resin composition improves, which is particularly preferable.

$$[\text{the polyarylate } (D) \text{ (parts by mass)}]/[\text{the liquid crystalline polyester } (B) \text{ (parts by mass)}] \leq 1.25 \quad (2).$$

<Mass Ratio Between (D) Polyarylate and (E) Polyimide>

When the mass ratio between the polyarylate (D) and the polyimide (E) in the polyaryletherketone resin composition satisfies the following formula (3), the phase separation structure of the polyaryletherketone resin composition is refined to improve toughness, which is particularly preferable.

$$[\text{the polyarylate } (D) \text{ (parts by mass)}]/[\text{the polyimide } (E) \text{ (parts by mass)}] \leq 0.25 \quad (3).$$

In addition to the polyimide (E) and the polyarylate (D) exhibiting high compatibility with the polyaryletherketone (A), the polyarylate (D) undergoes a transesterification reaction with the liquid crystalline polyester (B), which improves the compatibility/dispersibility of the liquid crystalline polyester (B) with the polyaryletherketone (A) and can achieve both the fluidity and toughness.

The polyaryletherketone resin composition of the third embodiment preferably forms a sea island structure, and the average diameter of the island phase is more preferably 1000 nm or less, still more preferably 500 nm or less. When the average diameter of the island phase is 1000 nm or less, the toughness tends to further improve. The average diameter of the island phase is usually 10 nm or more. The average diameter referred to herein is measured by the method used in the first embodiment.

The method for measuring the content of each resin component in the polyaryletherketone resin composition containing (A) a polyaryletherketone, (B) a liquid crystalline polyester, (D) a polyarylate, and (E) a polyimide according to the third embodiment of the present invention is the same as that of the first embodiment.

<(G) Fibrous Filler>

The polyaryletherketone resin composition of the first, second, and third embodiments of the present invention preferably contain a fibrous filler for the purpose of further improving their mechanical properties.

Examples of the fibrous filler include glass fiber, carbon fiber, aramid fiber, polyamide fiber, polyester fiber, vinylon fiber, cotton, hemp fiber, kenaf fiber, bamboo fiber, rayon, steel fiber, and aluminum fiber. Examples of the shape of these fibrous fillers include shapes of continuous fibers, short fibers such as chopped strands, and whiskers.

The content of the fibrous filler in the polyaryletherketone resin composition is preferably 10 parts by mass or more and 400 parts by mass or less with respect to 100 parts by mass of the polyaryletherketone (A). When the content is 10 parts by mass or more, the mechanical properties of the polyaryletherketone resin composition can be improved, and when the content is 400 parts by mass or less, molding processability can be maintained, which are preferable.

As a method for measuring the content of the fibrous filler, the polyaryletherketone resin composition is dissolved using a solvent in which all components except (G) a fibrous filler dissolve, the insoluble matter is filtered, the fibrous filler (G) is recovered as a filtered product, and the mass after washing is measured.

In the present invention, a form as a fiber reinforced plastic base obtained by impregnating the fibrous filler (G) in a continuous form or a reinforcing fiber base in which the fibrous filler (G) in a discontinuous form is dispersed with the polyaryletherketone resin composition of the first, second, or third embodiment described above can also be suitably used.

Examples of the fiber reinforced plastic base include the following two aspects. A first aspect is a fiber reinforced plastic base obtained by impregnating the fibrous filler (G) in a continuous form with a polyaryletherketone resin composition, and a second aspect is a fiber reinforced plastic base obtained by impregnating a reinforcing fiber base in which the fibrous filler (G) in a discontinuous form is dispersed with a polyaryletherketone resin composition.

In an embodiment of the present invention, the fibrous filler (G) in a continuous form in the first aspect refers to a filler in which the fibers are not cut. Examples of the form and arrangement of the fibrous filler (G) in a continuous form include those aligned in one direction, textiles (cloths), knitting, braids, and tows. Since the mechanical properties in a specific direction can be efficiently improved, the fibrous filler (G) in a continuous form formed by arranging the fibers in one direction is preferable.

The reinforcing fiber base in which the fibrous filler (G) in a discontinuous form is dispersed in the second aspect refers to a mat-like base in which the fibrous filler is cut and dispersed. The reinforcing fiber base can be obtained by any method such as a wet process in which fibers are dispersed in a solution and then produced into a sheet, or a dry process using a carding device or an airlaid device. From the viewpoint of productivity, a dry process using a carding device or an airlaid device is preferable. The lower limit of the number average fiber length of the fibrous filler (G) in a discontinuous form in the reinforcing fiber base is preferably 3 mm or more, more preferably 5 mm or more. When the number average fiber length of the fibrous filler (G) in a discontinuous form is 3 mm or more, the reinforcing effect by the discontinuous fibers is sufficiently exhibited, and the mechanical strength of the resulting fiber reinforced plastic base can be further improved. The upper limit of the number average fiber length of the fibrous filler (G) in a discontinuous form is preferably 100 mm or less, more preferably 50 mm or less, still more preferably 30 mm or less. When the number average fiber length of the fibrous filler (G) in a discontinuous form is 100 mm or less, the fluidity during molding can be further improved.

The number average fiber length of the fibrous filler (G) in a discontinuous form can be determined by the following method. First, a sample of 100 mm×100 mm is cut out from the fiber reinforced plastic base, and the cut sample is heated in an electric furnace at 600° C. for 1.5 hours to burn off a matrix resin. From the discontinuous reinforcing fibers thus obtained, 400 discontinuous reinforcing fiber bundles are randomly collected. The fiber lengths of the discontinuous reinforcing fiber bundles taken out are measured in units of 1 mm using a caliper, and the number average fiber length (Ln) can be calculated from the following formula.

$$Ln=\Sigma Li/400$$

(Li: Measured fiber length (i=1, 2, 3, . . . 400) (unit: mm)).

The number average fiber length of the fibrous filler (G) in a discontinuous form can be adjusted to the above range by cutting the fibers to a desired length at the time of producing the reinforcing fiber base. The orientation of the reinforcing fiber base material in which the fibrous filler (G) in a discontinuous form is dispersed is not particularly limited, and is preferably isotropically dispersed from the viewpoint of moldability.

Examples of the method for impregnating the fibrous filler (G) in a continuous form with the polyaryletherketone resin composition in the first aspect include a film method in which a film-shaped polyaryletherketone resin composition is melted and pressurized to impregnate a fibrous filler with the polyaryletherketone resin composition, a commingle process in which a fibrous polyaryletherketone resin composition is blended and spinned with a fibrous filler, then the fibrous polyaryletherketone resin composition is melted and pressurized to impregnate the fibrous filler with the polyaryletherketone resin composition, a powder impregnation method in which a powdery polyaryletherketone resin composition is dispersed in fiber gaps in a fibrous filler, and then the powdery polyaryletherketone resin composition is melted and pressurized to impregnate the fibrous filler with the polyaryletherketone resin composition, and a melting method in which a fibrous filler is immersed in a molten polyaryletherketone resin composition, and the fibrous filler is impregnated with the polyaryletherketone resin composition by pressurization. The melting method is preferable because various kinds of fiber reinforced plastic bases having various thicknesses and fiber volume contents can be produced.

Examples of the method for impregnating the reinforcing fiber base in which the fibrous filler (G) in a discontinuous form is dispersed with the polyaryletherketone resin composition in the second aspect of the present invention include a method in which a molten polyaryletherketone resin composition is supplied by an extruder to impregnate the reinforcing fiber base with the polyaryletherketone resin composition, a method in which a powdery polyaryletherketone resin composition is dispersed in a fiber layer of a reinforcing fiber base and melted, a method in which a polyaryletherketone resin composition is formed into a film and laminated with a reinforcing fiber base, then melted and pressurized, a method in which a polyaryletherketone resin composition is dissolved in a solvent and impregnated into a reinforcing fiber base in a solution state, and then the solvent is volatilized, a method in which a polyaryletherketone resin composition is fiberized and formed into a mixed yarn with a discontinuous fiber, and a method in which a polyaryletherketone resin composition is laminated using a meltblow non-woven fabric and then melted and pressurized.

Further, in the fiber reinforced plastic base of the present invention, a desired impregnation property can be selected according to the use and purpose thereof. Examples thereof include a prepreg having a higher impregnation property, a semi-impregnated semipreg, and a fabric having a low impregnation property. In general, a molding material having a higher impregnation property is preferable because a molded article having excellent dynamic characteristics can be obtained by molding in a short time.

Since the polyaryletherketone resin composition of the present invention is excellent in fluidity, the fiber reinforced plastic base obtained by impregnation has less fuzz and voids and is excellent in surface quality and toughness.

<Method for Producing Polyaryletherketone Resin Composition of Present Invention>

The method for producing the polyaryletherketone resin composition of the present invention is not particularly limited, and a method of dry blending: the polyaryletherketone (A) and the liquid crystalline polyester (B); the polyaryletherketone (A), the liquid crystalline polyester (B), the polyarylate (D), and the polyimide (E); or the polyaryletherketone (A), the thermoplastic resin (F), and the amine compound (C), supplying them from an extruder main feeder, supplying the fibrous filler (G) from a side feeder of the extruder as necessary, and melt-kneading them at a temperature equal to or higher than the melting point of the polyaryletherketone (A) can be preferably exemplified. The melting point can be measured using, for example, a differential scanning calorimeter.

<Method for Molding Polyaryletherketone Resin Composition of Present Invention>

The method for molding the polyaryletherketone resin composition of the present invention is not particularly limited, and for example, a molded article formed by injection molding, extrusion molding, compression molding, or the like, or a molded article such as a sheet or a film can be formed.

In addition, a press molding in which a material obtained by stacking a fiber reinforced plastic base impregnated with a polyaryletherketone resin composition in an any configuration is heated and pressurized, an autoclave molding in which the material is charged into an autoclave and heated and pressurized, a bagging molding in which the material is wrapped with a film or the like and heated in an oven while the inside thereof is decompressed and pressurized at atmospheric pressure, and a wrapping tape method in which a tape is wound around the material while tension is applied and the material is heated in an oven.

As the press molding, it is possible to employ a hot press method in which a fiber reinforced plastic base is placed in advance in a mold, pressed and heated together with moldtightening, and then the fiber reinforced plastic base is cooled by cooling the mold while the moldtightening is performed to obtain a molded article, or a stamping molding in which a fiber reinforced plastic base is heated in advance to a temperature equal to or higher than the melting temperature of a thermoplastic resin by a heating device such as a far infrared heater, a heating plate, a high temperature oven, or induction heating, and the thermoplastic resin is placed on a mold to be the lower face of the molding mold in a state of being melted and softened, and then the mold is closed to perform moldtightening, followed by press-cooling. The press molding is not particularly limited, and is preferably stamping molding from the viewpoint of accelerating the molding cycle and enhancing productivity.

In the polyaryletherketone resin composition of the present invention, an inorganic filler other than a fibrous filler such as titanium oxide or calcium carbonate, an antioxidant, a heat stabilizer, a UV absorber, a colorant, and the like can also be added as desired.

The molded article obtained from the resin composition of the present invention are used in electronic component applications represented by connectors, coils, sensors, LED lamps, sockets, resistors, relay cases, small switches, coil bobbins, capacitors, variable condenser cases, optical pick-ups, oscillators, various terminal boards, transformers, plugs, printed circuit boards, tuners, speakers, microphones, headphones, small motors, magnetic head bases, power modules, semiconductors, liquid crystals, FDD carriages, FDD chassis, motor brush holders, parabolic antennas, computer-related components, etc., electric device component applications such as power generators, electric motors, transformers, current transformers, voltage regulators, rectifiers, inverters, relays, power contacts, switches, breakers, knife switches, multipole rods, and electric component cabinets, home and office electrical product parts applications represented by VTR components, television components, irons, hair driers, rice cooker components, microwave oven components, audio and video equipment parts such as acoustic components, audio/laser disc (registered trademark), compact disk, and DVDs, lighting parts, refrigerator parts, air conditioner parts, typewriter parts, word processor parts, etc., mechanical related parts applications represented by office computer related parts, telephone related parts, facsimile related parts, copier related parts, cleaning jigs, motor parts, lighters, typewriters, etc., optical equipment, precision machine related parts applications represented by microscopes, binoculars, cameras, watches, etc., automotive and vehicle-related component applications such as alternator terminals, alternator connectors, IC regulators, potentiometer bases for light dimmers, various valves such as exhaust gas valves, fuel-related, exhaust-system, intake-system various pipes, air intake nozzle snorkels, intake manifolds, fuel pumps, engine cooling water joints, carburetor main bodies, carburetor spacers, exhaust gas sensors, cooling water sensors, oil temperature sensors, brake pad wear sensors, throttle position sensors, crankshaft position sensors, air flow meters, brake pad wear sensors, thermostat base for air conditioners, warm air flow control valves, brush holders for radiator motors, water pump impellers, turbine vanes, wiper motor-related components, distributors, starter switches, starter relays, wire harnesses for transmissions, windwasher nozzles, air conditioner panel switch boards, coils for fuel-related electromagnetic valves, fuse connectors, horn terminals, electric component insulating plates, step motor rotors, lamp sockets, lamp reflectors, lamp housings, brake pistons, solenoid bobbins, engine oil filters, and ignition device cases, and various aerospace applications.

EXAMPLES

The present invention will be described below with reference to Examples, but the present invention is not limited by these examples. Raw materials used in Examples and Comparative Examples are shown below.

<(A) Polyaryletherketone>
- (A-1) Polyetheretherketone ("Victrex (registered trademark)" 151G manufactured by Victrex plc., glass transition temperature: 151° C., melting point: 346° C., melt viscosity: 75 Pa·s)
- (A-2) Polyetheretherketone ("Victrex (registered trademark)" 90G manufactured by Victrex plc., glass transition temperature: 151° C., melting point: 346° C., melt viscosity: 55 Pa·s)

The melt viscosity is a value measured at a shear rate of 10,000 sec$^{-1}$ after heating at 380° C. for 5 minutes using a capillary of L=5 mm and D=0.5 mm using CAPILOGRAPH 1C manufactured by Toyo Seiki Seisaku-sho, Ltd.

<Liquid Crystalline Polyester (B)>
- (B-1) Liquid crystalline polyester ("Siveras (registered trademark)" LX70 manufactured by Toray Industries, Inc., melting point: 326° C.).

<(C) Amine Compound Having Two or More Amino Groups>
- (D-1) 4,4'-Diaminodiphenyl ether (manufactured by Tokyo Chemical Industry Co., Ltd., vapor pressure at 300° C.: 0.02 atm)
- (C-2) Hexamethylenediamine (manufactured by Tokyo Chemical Industry Co., Ltd., boiling point: 204° C.).

<(C') Amine Compound Having One Amino Group>
- (C'-1) 4-Phenoxyaniline (manufactured by Tokyo Chemical Industry Co., Ltd., vapor pressure at 300° C.: 0.02 atm).

<(D) Polyarylate>
- (D-1) Polyarylate ("U polymer (registered trademark)" 100 manufactured by Unitika Ltd., glass transition point: 200° C.).

<(E) Polyimide>
- (E-1) Polyimide ("Ultem (registered trademark)" 1010 manufactured by SABIC Innovative Plastics, glass transition point: 217° C.).

<(F) Thermoplastic Resin Having Carbonyl Group and/or Ester Bond>
- (F-1) Polybutylene terephthalate (Toraycon (registered trademark) 1100P manufactured by Toray Industries, Inc., melting point: 224° C.).

<(F') Thermoplastic Resin Having No Carbonyl Group or Ester Bond>
- (F'-1) Reference Example 1: polyphenylene sulfide (melting point: 280° C.).

<(G) Fibrous Filler>
- (G-1) Carbon fiber "TORAYCA (registered trademark)" cut fiber TV14-006 manufactured by Toray Industries, Inc.
- (G-2) Discontinuous carbonfiber mat A carbon fiber chopped yarn obtained by cutting "TORAYCA (registered trademark)" T700S-12k manufactured by Toray Industries, Inc. to a length of 20 mm was introduced into a carding device, and the web coming out was cross-lapped to form a sheet-like carbon fiber sheet having a basis weight of 100 g/m$^2$. The obtained carbon fiber sheet was placed in a press machine and pressurized at a pressure of 20 MPa for 5 seconds to obtain a discontinuous carbonfiber mat.

Reference Example 1

To a 70 liter autoclave with a stirrer and a bottom valve, 8.27 kg (70.00 mol) of 47.5% sodium hydrosulfide, 2.94 kg (70.63 mol) of 96% sodium hydroxide, 11.45 kg (115.50 mol) of N-methyl-2-pyrrolidone (NMP), 1.89 kg (23.1 mol) of sodium acetate, and 5.50 kg of ion-exchanged water were charged, and gradually heated to 245° C. over about 3 hours while nitrogen was passed at normal pressure, 9.77 kg of water and 0.28 kg of NMP were distilled off, and then a reaction vessel was cooled to 200° C. The amount of water remaining in the system per 1 mol of the charged amount of alkali metal sulfide was 1.06 mol including water consumed for hydrolysis of NMP. The scattered amount of hydrogen sulfide was 0.02 mol per 1 mol of the charged amount of alkali metal sulfide.

The reaction vessel was cooled to 200° C., thereafter 10.42 kg (70.86 mol) of p-dichlorobenzene and 9.37 kg (94.50 mol) of NMP were added, the reaction vessel was sealed under nitrogen gas, the temperature was raised from 200° C. to 270° C. at a rate of 0.6° C./min with stirring at 240 rpm, and the reaction was carried out at 270° C. for 140 minutes. Thereafter, 2.40 kg (133 mol) of water was press-fitted while cooling from 270° C. to 250° C. over 15 minutes. Then, the mixture was gradually cooled from 250° C. to 220° C. over 75 minutes, and then rapidly cooled to around room temperature, and the contents were taken out.

The contents were diluted with about 35 liters of NMP, stirred as a slurry at 85° C. for 30 minutes, and then filtered off with an 80 mesh wire mesh (opening: 0.175 mm) to obtain a solid. The obtained solid was washed with about 35 liters of NMP and filtered off in the same manner. An operation of adding the obtained solid to 70 liters of ion-exchanged water, stirring the mixture at 70° C. for 30 minutes, and then filtering the mixture with an 80 mesh wire mesh to recover the solid was repeated 3 times in total. The obtained solid and 32 g of acetic acid were added to 70 liters of ion-exchanged water, stirred at 70° C. for 30 minutes, and then filtered with an 80 mesh wire mesh. The obtained solid was further added to 70 liters of ion-exchanged water, stirred at 70° C. for 30 minutes, and then filtered with an 80 mesh wire mesh to recover a solid. The solid thus obtained was dried at 120° C. under nitrogen flow to obtain a dried polyphenylene sulfide resin. The weight average molecular weight was 48600 and the melting point was 280° C.

<Method for Producing Polyaryletherketone Resin Composition>

The raw materials shown in Examples 1 to 9, 12 to 28 and Comparative Examples 1 to 8, 13 to 18 in Tables 1, 2, 4 to 10 were dry-blended with the compositions shown in the tables, supplied from a main feeder of a twin screw extruder (TEX 30a manufactured by The Japan Steel Works, Ltd.), and melt-kneaded at a cylinder temperature of 360° C. and a screw rotation speed of 200 rpm. The strings discharged from the die were immediately cooled in a water bath, pelletized by a strand cutter, and vacuum-dried at 160° C. for 12 hours.

Of the raw materials shown in Examples 10, 29 and Comparative Examples 9, 19 in Tables 1, 2, and 11, the raw materials excluding the fibrous filler (G-1) were dry-blended with the compositions shown in the tables and supplied from a main feeder of a twin screw extruder (TEX 30α manufactured by The Japan Steel Works, Ltd.), the fibrous filler (G-1) was supplied from a side feeder (the one installed at a position of 0.35 as viewed from the upstream side when the total length of the screw is 1.0), they were melt-kneaded at a cylinder temperature of 360° C. and a screw rotation speed of 200 rpm. The strings discharged from the die were immediately cooled in a water bath, pelletized by a strand cutter, and vacuum-dried at 160° C. for 12 hours.

<Method for Producing Fiber Reinforced Plastic Base Impregnated with Polyaryletherketone Resin Composition>

Of the raw materials shown in Examples 11, 30 and Comparative Examples 10 to 12, 20 in Tables 3 and 12, the raw materials excluding the discontinuous carbonfiber mat (G-2) were dry-blended with the compositions shown in the tables, charged into a hopper of a single screw extruder heated to 380° C., melt-kneaded, and then extruded into a film from a film die to prepare a film having a thickness of 100 μm.

The winding direction of the discontinuous carbonfiber mat (G-2) was set to 0°, 24 discontinuous fiber mats were stacked so as to be (0°/90°/0°/90°/0°/90°) s, and the polyaryletherketone resin composition film was further stacked in the stacked discontinuous carbonfiber mat so that the mass ratio of the carbonfiber and the polyaryletherketone resin composition film was 50:50, then the whole was sandwiched between stainless steel plates, preheated at 380° C. for 90 seconds, and then hot-pressed at 370° C. for 180 seconds while a pressure of 2.0 MPa was applied. Then, the resultant was cooled to 50° C. in a pressurized state to obtain a fiber reinforced plastic base of 100 mm×100 mm×4 mm in thickness.

<Method for Evaluating Polyaryletherketone Resin Composition>

The evaluation methods in each Example and Comparative Example in Tables 1, 2, 4 to 11 will be described. The number n of evaluations was set to n=3 unless otherwise specified, and an average value was obtained.

(1) Tensile Property (Tensile Elongation at Break Measurement)

The resin composition pellets obtained in each Example and Comparative Example were freeze-pulverized/vacuum-dried, and injection-molded using a small injection molding machine (Haake MiniJet Pro manufactured by Thermo Fisher Scientific) under the conditions of a cylinder temperature of 380° C. and a mold temperature of 170° C. to form a dumbbell of the ISO527-2-5A standard as a molded article for a tensile test. The tensile test conditions are as follows.

Apparatus: universal testing machine (Autograph AG-20kNX manufactured by Shimadzu Corporation)
Atmosphere: 23° C.×50% RH
Length between chucks: 50 mm
Gauge length: 20 mm
Tensile speed: 5 mm/min.

(2) Viscosity Property (Melt Viscosity Measurement)

The resin composition pellets obtained in each Example and Comparative Example were freeze-pulverized/vacuum-dried, and used as a sample for melt viscosity measurement. The vacuum drying condition is 160° C. for 12 hours. The melt viscosity measurement conditions are as follows.

Apparatus: CAPILOGRAPH 1C (manufactured by Toyo Seiki Seisaku-sho, Ltd.)

Measurement temperature: 380° C.
Capillary: L=5 mm, D=0.5 mm
Shear rate: 10000 sec$^{-1}$
Melt viscosity: viscosity after retention for 5 minutes under the above conditions.

(3) Particle Diameter of Island Phase

The resin composition pellets obtained in each Example and Comparative example were freeze-pulverized/vacuum-dried, and injection-molded using a small injection molding machine (Haake MiniJet Pro manufactured by Thermo Fisher Scientific) under the conditions of a cylinder temperature of 380° C. and a mold temperature of 170° C. to form a dumbbell of the ISO527-2-5A standard. The vicinity of the center of the molded article was cut in the resin flow direction to obtain a thin section having a thickness of 80 nm, and the thin section was observed with a transmission electron microscope. From the obtained image, the maximum diameter and the minimum diameter of each particle of 100 island phases were measured using image processing software "Scion Image" (manufactured by Scion Corporation) to obtain an average value, and then the number average value of the average values of the 100 island phases was obtained.

<Method for Evaluating Fiber Reinforced Plastic Base Impregnated with Polyaryletherketone Resin Composition>

Evaluation methods in each Example and Comparative Example in Tables 3 and 12 will be described. The number n of evaluations was set to n=3 unless otherwise specified, and an average value was obtained.

(4) Impregnation Property (Impregnation Rate Evaluation)

The cross section cut in the thickness direction of the fiber reinforced plastic base obtained in each Example and Comparative Example was observed as follows. A sample in which the fiber reinforced plastic base was embedded in an epoxy resin was prepared, and the sample was polished until the cross section of the fiber reinforced plastic base in the thickness direction was able to be observed well. The polished sample was photographed at a magnification of 200 using a digital microscope VHX-1000 (controller unit)/VHZ-100R (measurement unit) (manufactured by KEYENCE CORPORATION). The photographing range was a range of 4.0 mm in thickness×1.5 mm in width of the fiber reinforced plastic base. In the photographed image, the area of the sites occupied by the resin and the area of the sites serving as voids were determined, and the impregnation rate was calculated by the following formula.

Impregnation rate (%)=100×(total area of sites occupied by resin)/{(total area of sites occupied by resin)+(total area of sites constituting voids)}

The impregnation rate of the fiber reinforced plastic base was evaluated in the following two stages using this impregnation rate as a criterion, and Good was regarded as acceptable.

Good: The impregnation rate is 90% or more and 100% or less.
Bad: The impregnation rate is less than 90%.

(5) Impact Property (Unnotched Charpy Impact Strength Measurement)

The central portion of the fiber reinforced plastic base having a thickness of 4 mm obtained in each Example and Comparative Example was cut into a shape of 80 mm×10 mm×4 mm in thickness, and in accordance with ISO179-1, the unnotched Charpy impact strength was measured at 23° C., and the number average value for 5 times was calculated.

Examples 1 to 10, Comparative Examples 1 to 9

TABLE 1-1

|  |  |  | Example 1 | Example 2 | Example 3 | Example 4 | Example 5 |
|---|---|---|---|---|---|---|---|
| Resin composition | (A) Polyaryletherketone | Type | A-1 | A-1 | A-1 | A-1 | A-1 |
|  |  | Part by mass | 100 | 100 | 100 | 100 | 100 |
|  | (C) Amine compound having two or more amino groups | Type | C-1 | C-1 | C-1 | C-1 | C-1 |
|  |  | Part by mass | 0.15 | 0.5 | 3 | 6 | 0.5 |
|  | (B) Liquid crystalline polyester | Type | B-1 | B-1 | B-1 | B-1 | B-1 |
|  |  | Part by mass | 10 | 10 | 10 | 10 | 2 |
|  | (F) Thermoplastic resin having carbonyl group and/or ester bond | Type |  |  |  |  |  |
|  |  | Part by mass |  |  |  |  |  |
|  | (D) Fibrous filler | Type | — | — | — | — | — |
|  |  | Part by mass | — | — | — | — | — |
| Particle diameter | Dispersion particle diameter of (B) liquid crystalline polyester or (F) thermoplastic resin in resin composition | nm | 130 | 80 | 100 | 220 | 80 |
| Tensile property | Tensile elongation at break | % | 20 | 26 | 22 | 18 | 26 |
| Viscosity property | Melt viscosity of resin composition | Pa·s | 33 | 35 | 38 | 43 | 61 |

TABLE 1-2

|  |  |  | Example 6 | Example 7 | Example 8 | Example 9 | Example 10 |
|---|---|---|---|---|---|---|---|
| Resin composition | (A) Polyaryletherketone | Type | A-1 | A-1 | A-1 | A-1 | A-1 |
|  |  | Part by mass | 100 | 100 | 100 | 100 | 100 |
|  | (C) Amine compound having two or more amino groups | Type | C-1 | C-1 | C-2 | C-1 | C-1 |
|  |  | Part by mass | 0.5 | 0.5 | 0.5 | 0.5 | 0.5 |
|  | (B) Liquid crystalline polyester | Type | B-1 | B-1 | B-1 |  | B-1 |
|  |  | Part by mass | 4 | 32 | 10 |  | 10 |
|  | (F) Thermoplastic resin having carbonyl group and/or ester bond | Type |  |  |  | F-1 |  |
|  |  | Part by mass |  |  |  | 10 |  |
|  | (D) Fibrous filler | Type | — | — | — | — | G-1 |
|  |  | Part by mass | — | — | — | — | 43 |
| Particle diameter | Dispersion particle diameter of (B) liquid crystalline polyester or (F) thermoplastic resin in resin composition | nm | 80 | 780 | 170 | 70 |  |
| Tensile property | Tensile elongation at break | % | 26 | 16 | 18 | 34 | 1.6 |
| Viscosity property | Melt viscosity of resin composition | Pa·s | 43 | 23 | 34 | 55 |  |

TABLE 2-1

|  |  |  | Comparative Example 1 | Comparative Example 2 | Comparative Example 3 | Comparative Example 4 | Comparative Example 5 |
|---|---|---|---|---|---|---|---|
| Resin composition | (A) Polyaryletherketone | Type | A-1 | A-2 | A-1 | A-1 | A-1 |
|  |  | Part by mass | 100 | 100 | 100 | 100 | 100 |
|  | (C) Amine compound having two or more amino groups | Type | — | — | C-1 | C-1 | C-1 |
|  |  | Part by mass | — | — | 0.05 | 0.5 | 0.5 |
|  | (C') Amine compound having one amino group | Type | — | — | — | — | — |
|  |  | Part by mass | — | — | — | — | — |

TABLE 2-1-continued

|  |  |  | Comparative Example 1 | Comparative Example 2 | Comparative Example 3 | Comparative Example 4 | Comparative Example 5 |
|---|---|---|---|---|---|---|---|
|  | (B) Liquid crystalline polyester | Type | — | — | B-1 | B-1 | B-1 |
|  |  | Part by mass | — | — | 10 | 0.4 | 110 |
|  | (F') Thermoplastic resin having no carbonyl group or ester bond | Type | — | — | — | — | — |
|  |  | Part by mass | — | — | — | — | — |
|  | (D) Fibrous filler | Type | — | — | — | — | — |
|  |  | Part by mass | — | — | — | — | — |
| Particle diameter | Dispersion particle diameter of (B) liquid crystalline polyester or (F') thermoplastic resin in resin composition | nm | None | None | 3100 | 70 | 9200 |
| Tensile property | Tensile elongation at break | % | 27 | 16 | 4 | 30 | 2 |
| Viscosity property | Melt viscosity of resin composition | Pa·s | 79 | 55 | 32 | 84 | 20 |

TABLE 2-2

|  |  |  | Comparative Example 6 | Comparative Example 7 | Comparative Example 8 | Comparative Example 9 |
|---|---|---|---|---|---|---|
| Resin composition | (A) Polyaryletherketone | Type | A-1 | A-1 | A-1 | A-1 |
|  |  | Part by mass | 100 | 100 | 100 | 100 |
|  | (C) Amine compound having two or more amino groups | Type | — | C-1 | — | C-1 |
|  |  | Part by mass | — | 0.5 | — | 0.05 |
|  | (C') Amine compound having one amino group | Type | C'-1 | — | — | — |
|  |  | Part by mass | 0.5 | — | — | — |
|  | (B) Liquid crystalline polyester | Type | B-1 | — | — | B-1 |
|  |  | Part by mass | 10 | — | — | 10 |
|  | (F') Thermoplastic resin having no carbonyl group or ester bond | Type | — | F'-1 | F'-1 | — |
|  |  | Part by mass | — | 10 | 10 | — |
|  | (D) Fibrous filler | Type | — | — | — | G-1 |
|  |  | Part by mass | — | — | — | 43 |
| Particle diameter | Dispersion particle diameter of (B) liquid crystalline polyester or (F') thermoplastic resin in resin composition | nm | 2800 | 2100 | 2200 | — |
| Tensile property | Tensile elongation at break | % | 5 | 10 | 7 | 0.3 |
| Viscosity property | Melt viscosity of resin composition | Pa·s | 33 | 72 | 67 | — |

Comparison between Examples 1 to 10 and Comparative Examples 1 to 9 shows that blending specific amounts of the amine compound (C) having two or more amino groups and the liquid crystalline polyester (B) or the thermoplastic resin (F) having a carbonyl group and/or an ester bond in the polyaryletherketone (A) resin realizes an excellent balance between toughness and fluidity.

Comparison between Example 2 and Example 8 shows that using the amine compound (C) having a vapor pressure of less than 1 atm at 300° C. and having the structure of the general formula (I) realizes further excellent toughness.

Comparison between Example 2 and Comparative Example 6 shows that using the amine compound (C) having two or more amino groups enables the liquid crystalline polyester (B) to be finely dispersed, which realizes excellent toughness.

Comparison of Examples 2 and 9 with Comparative Example 7 shows that using the liquid crystalline polyester (B) or the thermoplastic resin (F) having a carbonyl group and/or an ester bond can achieve fine dispersion and realizes excellent toughness.

Example 10 is a fiber reinforced polyaryletherketone resin composition obtained by kneading a fibrous filler with the polyaryletherketone resin composition of Example 2, and Comparative Example 9 is a fiber reinforced polyaryletherketone resin composition obtained by kneading a fibrous filler with the polyaryletherketone resin composition of Comparative Example 3. Comparison between Example 10 and Comparative Example 9 shows that blending a specific amount of the amine compound (C) having two or more amino groups realizes excellent toughness of a composite material as well.

Example 11, Comparative Examples 10 to 12

TABLE 3

|  |  |  | Example 11 | Comparative Example 10 | Comparative Example 11 | Comparative Example 12 |
|---|---|---|---|---|---|---|
| Resin composition | (A) Polyaryletherketone | Type | A-1 | A-2 | A-1 | A-1 |
|  |  | Part by mass | 100 | 100 | 100 | 100 |
|  | (C) Amine compound having two or more amino groups | Type | C-1 | — | — | C-1 |
|  |  | Part by mass | 0.5 | — | — | 0.05 |
|  | (B) Liquid crystalline polyester | Type | B-1 | — | — | B-1 |
|  |  | Part by mass | 10 | — | — | 10 |
|  | (D) Fibrous filler | Type | G-2 | G-2 | G-2 | G-2 |
|  |  | Part by mass | 110.5 | 100 | 100 | 110.05 |
| Impregnation property | Impregnation rate evaluation | — | Good | Bad | Bad | Good |
| Impact property | Unnotched Charpy impact strength | KJ/m$^2$ | 55 | 22 | 27 | 33 |

Example 11 is a fiber reinforced plastic base obtained by impregnating a fibrous filler with the polyaryletherketone resin composition of Example 2, Comparative Example 10 is a fiber reinforced plastic base obtained by impregnating a fibrous filler with the polyaryletherketone resin composition of Comparative Example 2, Comparative Example 11 is a fiber reinforced plastic base obtained by impregnating a fibrous filler with the polyaryletherketone resin composition of Comparative Example 1, and Comparative Example 12 is a fiber reinforced plastic base obtained by impregnating a fibrous filler with the polyaryletherketone resin composition of Comparative Example 3. Comparison between Example 11 and Comparative Examples 10 to 12 shows that blending specific amounts of the amine compound (C) having two or more amino groups and the liquid crystalline polyester (B) in the polyaryletherketone (A) resin can achieve a fiber reinforced plastic base of excellent impregnation property and toughness.

Example 12, Comparative Examples 2, 13 to 16

TABLE 4

|  |  |  | Example 12 | Comparative Example 2 | Comparative Example 13 | Comparative Example 14 | Comparative Example 15 | Comparative Example 16 |
|---|---|---|---|---|---|---|---|---|
| Composition | (A-2) Polyaryletherketone | Part by mass | 100 | 100 | 100 | 100 | 100 | 100 |
|  | (B-1) Liquid crystalline polyester |  | 15.0 | — | 15.0 | 15.0 | 15.0 | — |
|  | (D-1) Polyarylate |  | 5.0 | — | — | 5.0 | — | 5.0 |
|  | (E-1) Polyimide |  | 20.0 | — | — | — | 20.0 | 20.0 |
| Phase separation state | Average diameter of island phase in resin composition | nm | 420 | None | 4800 | 4000 | 4200 | None |
| Toughness | Tensile elongation at break | % | 12 | 16 | 3.2 | 4.9 | 5.0 | 17 |
| Fluidity | Melt viscosity of resin composition | Pa·s | 26 | 55 | 30 | 27 | 28 | 68 |

Comparison between Example 12 and Comparative Examples 2, 13 to 16 shows that only when all of the liquid crystalline polyester (B), the polyarylate (D), and the polyimide (E) are blended in specific amounts with respect to the polyaryletherketone (A), the average diameter of the island phase is refined, and the balance between toughness and fluidity is excellent.

Examples 12 to 16, Comparative Example 17

TABLE 5

|  |  |  | Example 13 | Example 14 | Example 12 | Example 15 | Example 16 | Comparative Example 17 |
|---|---|---|---|---|---|---|---|---|
| Composition | (A-2) Polyaryletherketone | Part by mass | 100 | 100 | 100 | 100 | 100 | 100 |
|  | (B-1) Liquid crystalline polyester |  | 1.0 | 5.0 | 15.0 | 20.0 | 30.0 | 35.0 |
|  | (D-1) Polyarylate |  | 0.33 | 1.7 | 5.0 | 6.7 | 10.0 | 11.7 |
|  | (E-1) Polyimide |  | 1.3 | 6.7 | 20.0 | 26.7 | 40.0 | 46.7 |
|  | (D-1)/(B-1) mass ratio |  | — | 0.33 | 0.33 | 0.33 | 0.33 | 0.33 |
|  | (D-1)/(E-1) mass ratio |  | — | 0.25 | 0.25 | 0.25 | 0.25 | 0.25 |
| Phase separation state | Average diameter of island phase in resin composition | nm | 400 | 380 | 420 | 540 | 980 | 1800 |
| Toughness | Tensile elongation at break | % | 15 | 14 | 12 | 10 | 9.4 | 5.8 |
| Fluidity | Melt viscosity of resin composition | Pa·s | 46 | 34 | 26 | 23 | 20 | 18 |

Examples 12 to 16 and Comparative Example 17 are experimental examples in which the blending amount of the liquid crystalline polyester (B) was changed from 1 part by mass to 35 parts by mass per 100 parts by mass of the polyaryletherketone (A), and the blending amounts of the polyarylate (D) and the polyimide (E) were changed accordingly so that the mass ratio of the liquid crystalline polyester (B) to the polyarylate (D) and the mass ratio of the polyarylate (D) to the polyimide (E) did not change. Comparison of these experimental examples shows that when the blending amount of the liquid crystalline polyester (B) is in the range of 1 part by mass or more and 30 parts by mass or less per 100 parts by mass of the polyaryletherketone (A), the average diameter of the island phase is refined and the toughness is excellent, but when the blending amount of the liquid crystalline polyester (B) exceeds 30 parts by mass, the average diameter of the island phase is coarsened and the toughness is insufficient.

Examples 12, 17, Comparative Example 18

TABLE 6

|  |  |  | Example 12 | Example 17 | Comparative Example 18 |
|---|---|---|---|---|---|
| Composition | (A-2) Polyaryletherketone | Part by mass | 100 | 100 | 100 |
|  | (B-1) Liquid crystalline polyester |  | 15.0 | 15.0 | 15.0 |
|  | (D-1) Polyarylate |  | 5.0 | 15.0 | 20.0 |
|  | (E-1) Polyimide |  | 20.0 | 20.0 | 20.0 |
|  | (D-1)/(B-1) mass ratio |  | 0.33 | 1.00 | 1.33 |
|  | (D-1)/(E-1) mass ratio |  | 0.25 | 0.75 | 1.00 |
| Phase separation state | Average diameter of island phase in resin composition | nm | 420 | 1500 | 2200 |
| Toughness | Tensile elongation at break | % | 12 | 7.2 | 4.9 |
| Fluidity | Melt viscosity of resin composition | Pa·s | 26 | 28 | 30 |

Examples 12, 17 and Comparative Example 18 are experimental examples in which the blending amount of the polyarylate (D) was changed from 5 parts by mass to 20 parts by mass per 100 parts by mass of the polyaryletherketone (A). Comparison of these experimental examples shows that when the blending amount of the polyarylate (D) exceeds 15 parts by mass per 100 parts by mass of the polyaryletherketone (A), the average diameter of the island phase is coarsened, and the toughness is insufficient.

Examples 12, 18, 19

TABLE 7

|  |  |  | Example 12 | Example 18 | Example 19 |
|---|---|---|---|---|---|
| Composition | (A-2) Polyaryletherketone | Part by mass | 100 | 100 | 100 |
|  | (B-1) Liquid crystalline polyester |  | 15.0 | 15.0 | 15.0 |
|  | (D-1) Polyarylate |  | 5.0 | 5.0 | 5.0 |
|  | (E-1) Polyimide |  | 20.0 | 50.0 | 60.0 |
|  | (D-1)/(B-1) mass ratio |  | 0.33 | 0.33 | 0.33 |
|  | (D-1)/(E-1) mass ratio |  | 0.25 | 0.10 | 0.08 |
| Phase separation state | Average diameter of island phase in resin composition | nm | 420 | 360 | 300 |
| Toughness | Tensile elongation at break | % | 12 | 14 | 14 |
| Fluidity | Melt viscosity of resin composition | Pa·s | 26 | 42 | 50 |

Examples 12, 18, and 19 are experimental examples in which the blending amount of the polyimide (E) was changed from 20 parts by mass to 60 parts by mass per 100 parts by mass of the polyaryletherketone (A). The comparison of these experimental examples shows that when the blending amount of the polyimide (E) is 60 parts by mass or less per 100 parts by mass of the polyaryletherketone (A), the balance between toughness and fluidity is excellent, and when the blending amount of the polyimide (E) is 50 parts by mass or less, the fluidity is more excellent, which is further preferable.

Examples 20 to 24

TABLE 8

|  |  |  | Example 20 | Example 21 | Example 22 | Example 23 | Example 24 |
|---|---|---|---|---|---|---|---|
| Composition | (A-2) Polyaryletherketone | Part by mass | 100 | 100 | 100 | 100 | 100 |
|  | (B-1) Liquid crystalline polyester |  | 10.0 | 10.0 | 10.0 | 10.0 | 10.0 |
|  | (D-1) Polyarylate |  | — | 0.5 | 1.0 | 5.0 | 10.0 | 12.5 |
|  | (E-1) Polyimide |  | — | 2.0 | 4.0 | 20.0 | 40.0 | 50.0 |
|  | (D-1)/(B-1) mass ratio |  | — | 0.05 | 0.10 | 0.50 | 1.00 | 1.25 |
|  | (D-1)/(E-1) mass ratio |  | — | 0.25 | 0.25 | 0.25 | 0.25 | 0.25 |
| Phase separation state | Average diameter of island phase in resin composition | nm | 1400 | 1000 | 400 | 430 | 390 |
| Toughness | Tensile elongation at break | % | 6.9 | 9.1 | 13 | 13 | 14 |
| Fluidity | Melt viscosity of resin composition | Pa · s | 30 | 30 | 31 | 38 | 45 |

Examples 20 to 24 are experimental examples in which the mass ratio of the liquid crystalline polyester (B) and the polyarylate (D) ((D)/(B) mass ratio) was changed. These experimental examples show that when the (D)/(B) mass ratio is 0.10 or more and 1.25 or less, the average diameter of the island phase is further refined, the toughness is improved, and the balance with fluidity is excellent.

Examples 12, 25, 26

TABLE 9

|  |  |  | Example 25 | Example 12 | Example 26 |
|---|---|---|---|---|---|
| Composition | (A-2) Polyaryletherketone | Part by mass | 100 | 100 | 100 |
|  | (B-1) Liquid crystalline polyester |  | 15.0 | 15.0 | 15.0 |
|  | (D-1) Polyarylate |  | 5.0 | 5.0 | 5.0 |
|  | (E-1) Polyimide |  | 40.0 | 20.0 | 15.0 |
|  | (D-1)/(B-1) mass ratio |  | 0.33 | 0.33 | 0.33 |
|  | (D-1)/(E-1) mass ratio |  | 0.13 | 0.25 | 0.33 |
| Phase separation state | Average diameter of island phase in resin composition | nm | 380 | 420 | 1400 |
| Toughness | Tensile elongation at break | % | 13 | 12 | 7.2 |
| Fluidity | Melt viscosity of resin composition | Pa · s | 28 | 26 | 25 |

Examples 12, 25, and 26 are experimental examples in which the mass ratio of the polyarylate (D) and the polyimide (E) ((D)/(E) mass ratio) was changed. These experimental examples show that when the (D)/(E) mass ratio is 0.25 or less, the average diameter of the island phase tends to be further refined and the toughness tends to be improved.

Examples 12, 27, 28

TABLE 10

|  |  |  | Example 27 | Example 12 | Example 28 |
|---|---|---|---|---|---|
| Composition | (A-2) Polyaryletherketone | Part by mass | 100 | 100 | 100 |
|  | (B-1) Liquid crystalline polyester |  | 15.0 | 15.0 | 15.0 |
|  | (D-1) Polyarylate |  | 1.0 | 5.0 | 12.0 |
|  | (E-1) Polyimide |  | 24.0 | 20.0 | 13.0 |
|  | (D-1)/(B-1) mass ratio |  | 0.07 | 0.33 | 0.80 |
|  | (D-1)/(E-1) mass ratio |  | 0.04 | 0.25 | 0.92 |
| Phase separation state | Average diameter of island phase in resin composition | nm | 1400 | 420 | 1500 |
| Toughness | Tensile elongation at break | % | 7.2 | 12 | 7.0 |
| Fluidity | Melt viscosity of resin composition | Pa · s | 30 | 26 | 26 |

Examples 12, 27, and 28 are experimental examples in which the contents of the polyaryletherketone (A) and the liquid crystalline polymer (B) in a polyaryletherketone resin composition were fixed, and the contents of the polyarylate (D) and the polyimide (E) were changed. These experimental examples satisfy the (D)/(B) mass ratio of 0.10 or more and 1.25 or less and the (D)/(E) mass ratio of 0.25 or less, and it is apparent that the average diameter of the island phase is refined to 1000 nm or less, and the toughness tends to improve.

Example 29, Comparative Example 19

TABLE 11

|  |  |  | Example 29 | Comparative Example 19 |
|---|---|---|---|---|
| Composition | (A-2) Polyaryletherketone | Part by mass | 100 | 100 |
|  | (B-1) Liquid crystalline polyester |  | 15.0 | 15.0 |
|  | (D-1) Polyarylate |  | 5.0 | — |
|  | (E-1) Polyimide |  | 20.0 | — |
|  | (G-1) Fibrous filler |  | 56 | 46 |
| Toughness | Tensile elongation at break | % | 1.0 | 0.25 |

Example 29 is a fiber reinforced polyaryletherketone resin composition obtained by kneading a fibrous filler with the polyaryletherketone resin composition of Example 12, and Comparative Example 19 is a fiber reinforced polyaryletherketone resin composition obtained by kneading a fibrous filler with the polyaryletherketone resin composition of Comparative Example 13. Example 29 is an experimental example in which 40 parts by mass of the fibrous filler (G-1) per 100 parts by mass of resin is further blended in the resin composition of Example 12, and Comparative Example 19 is an experimental example in which 40 parts by mass of the fibrous filler (G-1) per 100 parts by mass of resin is further blended in the resin composition of Comparative Example 13. These experimental examples show that blending specific amounts of the liquid crystalline polyester (B), the polyarylate (D), and the polyimide (E) with respect to the polyaryletherketone (A) causes the toughness to improve in the case of blending a fibrous filler as well.

Example 30, Comparative Examples 10, 20

TABLE 12

|  |  |  | Example 30 | Comparative Example 10 | Comparative Example 20 |
|---|---|---|---|---|---|
| Composition | (A-2) Polyaryletherketone | Part by mass | 100 | 100 | 100 |
|  | (B-1) Liquid crystalline polyester |  | 15.0 | — | 15.0 |
|  | (D-1) Polyarylate |  | 5.0 | — | — |
|  | (E-1) Polyimide |  | 20.0 | — | — |
|  | (G-2) Fibrous filler |  | 140 | 100 | 115 |
| Impregnation property | Impregnation rate evaluation | — | Good | Bad | Good |
| Impact resistance | Unnotched Charpy impact strength | kJ/m$^2$ | 48 | 22 | 30 |

Example 30 is a fiber reinforced plastic base obtained by impregnating a fibrous filler with the polyaryletherketone resin composition of Example 12, Comparative Example 10 is a fiber reinforced plastic base obtained by impregnating a fibrous filler with the polyaryletherketone resin composition of Comparative Example 2, and Comparative Example 20 is a fiber reinforced plastic base obtained by impregnating a fibrous filler with the polyaryletherketone resin composition of Comparative Example 13. Example 30 is an experimental example in which the same part by mass of the fibrous filler (G-2) (discontinuous carbonfiber mat) as that of the resin composition was impregnated with the resin composition of Example 12, Comparative Example 10 is an experimental example in which the same part by mass of the fibrous filler (G-2) (discontinuous carbonfiber mat) as that of the resin composition was impregnated with the resin composition of Comparative Example 2, and Comparative Example 20 is an experimental example in which the same part by mass of the fibrous filler (G-2) (discontinuous carbonfiber mat) as that of the resin composition was impregnated with the resin composition of Comparative Example 13 to produce a fiber reinforced plastic base. These experimental examples show that only when all of the liquid crystalline polyester (B), the polyarylate (D), and a polyimide (E) are blended in specific amounts with respect to the polyaryletherketone (A), the impregnation property is excellent, and the impact resistance is excellent.

INDUSTRIAL APPLICABILITY

The polyaryletherketone resin composition of the present invention can be molded by any method such as typically known injection molding, compression molding, or extrusion molding, and can be processed into various electrical and electronic parts, automobile parts, aircraft parts, and the like by taking advantage of excellent toughness and fluidity. Further, by using it as a molded article in combination with a fibrous filler, it can be expected to contribute to improvement of fuel efficiency and reduction of global warming gas emission by further reducing weight, particularly in automobile and aerospace applications.

The invention claimed is:

1. A polyaryletherketone resin composition
comprising, with respect to 100 parts by mass of a polyaryletherketone (A), 1 part by mass or more and 100 parts by mass or less of a liquid crystalline polyester (B), wherein the polyaryletherketone resin composition forms a sea island structure, and an island phase has an average diameter of 10 nm or more and 1000 nm or less; and
further comprising, with respect to 100 parts by mass of the polyaryletherketone (A), 0.1 parts by mass or more and 10 parts by mass or less of an amine compound (C) having two or more amino groups.

2. A polyaryletherketone resin composition
comprising, with respect to 100 parts by mass of a polyaryletherketone (A), 1 part by mass or more and 100 parts by mass or less of a liquid crystalline polyester (B), wherein the polyaryletherketone resin composition forms a sea island structure, and an island phase has an average diameter of 10 nm or more and 1000 nm or less; and
further comprising, per 100 parts by mass of the polyaryletherketone (A):

0.1 parts by mass or more and 15 parts by mass or less of a polyarylate (D); and
0.4 parts by mass or more and 60 parts by mass or less of a polyimide (E).

3. A polyaryletherketone resin composition comprising, with respect to 100 parts by mass of a polyaryletherketone (A):
0.1 parts by mass or more and less than 10 parts by mass of an amine compound (C) having two or more amino groups; and
1 part by mass or more and less than 100 parts by mass of a thermoplastic resin (F) having a carbonyl group and/or an ester bond,
wherein in the polyaryletherketone resin composition, the polyaryletherketone (A) forms a sea phase, the thermoplastic resin (F) having a carbonyl group and/or an ester bond forms an island phase, and the island phase has a particle diameter of 10 nm or more and 1000 nm or less.

4. The polyaryletherketone resin composition according to claim 3, wherein the thermoplastic resin (F) having a carbonyl group and/or an ester bond is at least one thermoplastic resin selected from the group consisting of a polyimide resin, a polyester resin, a polyarylate resin, and a polycarbonate resin.

5. The polyaryletherketone resin composition according to claim 1, wherein the amine compound (C) having two or more amino groups has a vapor pressure of less than 1 atm at 300° C.

6. The polyaryletherketone resin composition according to claim 1, wherein the amine compound (C) having two or more amino groups is an amine compound represented by a general formula (I) shown below:

$$Ar\!-\!\!-\!(NH_2)_n \qquad (I)$$

wherein Ar represents an aryl group, and n is an integer of 2 to 6.

7. A polyaryletherketone resin composition comprising, per 100 parts by mass of (A) a polyaryletherketone:
1 part by mass or more and 30 parts by mass or less of a liquid crystalline polyester (B);
0.1 parts by mass or more and 15 parts by mass or less of a polyarylate (D); and
0.4 parts by mass or more and 60 parts by mass or less of a polyimide (E).

8. The polyaryletherketone resin composition according to claim 7, wherein the polyaryletherketone resin composition forms a sea island structure, and an island phase has an average diameter of 10 nm or more and 1000 nm or less.

9. The polyaryletherketone resin composition according to claim 7, the polyaryletherketone resin composition satisfying all of mass ratios represented by formulas (1) to (3) shown below:

$$[\text{the polyarylate }(D)\text{ (parts by mass)}]/[\text{the liquid crystalline polyester }(B)\text{ (parts by mass)}] \geq 0.10 \qquad (1)$$

$$[\text{the polyarylate }(D)\text{ (parts by mass)}]/[\text{the liquid crystalline polyester }(B)\text{ (parts by mass)}] \leq 1.25 \qquad (2)$$

$$[\text{the polyarylate }(D)\text{ (parts by mass)}]/[\text{the polyimide }(E)\text{ (parts by mass)}] \leq 0.25 \qquad (3).$$

10. A fiber reinforced polyaryletherketone resin composition obtained by kneading 10 parts by mass or more and 400 parts by mass or less of a fibrous filler (G) with respect to 100 parts by mass of the polyaryletherketone (A) with the polyaryletherketone resin composition according to claim 1.

11. A fiber reinforced plastic base obtained by impregnating the fibrous filler (G) in a continuous form or a reinforcing fiber base in which the fibrous filler (G) in a discontinuous form is dispersed with the polyaryletherketone resin composition according to claim 10.

12. A molded article obtained by molding the polyaryletherketone resin composition according to claim 1.

13. The polyaryletherketone resin composition according to claim 3, wherein the amine compound (C) having two or more amino groups has a vapor pressure of less than 1 atm at 300° C.

14. The polyaryletherketone resin composition according to claim 3, wherein the amine compound (C) having two or more amino groups is an amine compound represented by a general formula (I) shown below:

$$Ar\!-\!(NH_2)_n \qquad (I)$$

wherein Ar represents an aryl group, and n is an integer of 2 to 6.

15. A fiber reinforced polyaryletherketone resin composition obtained by kneading 10 parts by mass or more and 400 parts by mass or less of a fibrous filler (G) with respect to 100 parts by mass of the polyaryletherketone (A) with the polyaryletherketone resin composition according to claim 3.

16. A fiber reinforced plastic base obtained by impregnating the fibrous filler (G) in a continuous form or a reinforcing fiber base in which the fibrous filler (G) in a discontinuous form is dispersed with the polyaryletherketone resin composition according to claim 15.

17. A molded article obtained by molding the polyaryletherketone resin composition according to claim 3.

* * * * *